United States Patent Office 3,527,791
Patented Sept. 8, 1970

3,527,791
NOVEL PROCESS FOR THE PREPARATION
OF INDANE DERIVATIVES
Robert Bucourt, Clichy-sous-Bois, and Jean Tessier, Vincennes, France, assignors to Roussel-UCLAF, S.A., Paris, France, a corporation of France
No Drawing. Filed June 1, 1966, Ser. No. 554,356
Claims priority, application France, June 9, 1965, 20,062
Int. Cl. C07c 69/74
U.S. Cl. 260—468                  12 Claims

ABSTRACT OF THE DISCLOSURE

The invention relates to the preparation of indane derivatives of the general Formula I:

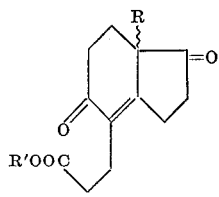

wherein R is a lower alkyl radical, and R' is hydrogen or a lower alkyl radical from the condensation of lower alkyl esters of 5-oxo-6-heptenoic acid and 2-alkyl-4-carboxy-cyclopentane-1,3-dione.

THE PRIOR ART

These compounds which find their application as intermediate products in the synthesis of steroid derivatives and related compounds were previously prepared by condensation of a lower alkyl ester of 5-oxo-6-heptenoic acid with a 2-alkyl-cyclopentane-1,3-dione, followed by a treatment of the condensation product with an acid or a Lewis-type mixed acid base (see in particular the copending, commonly assigned United States patent application Ser. No. 361,872, filed Apr. 22, 1964, now Pat. No. 3,413,314).

OBJECTS OF THE INVENTION

An object of the present invention is the development of an improved process for the production of indanes of the general Formula I.

Another object of the present invention is the development of a process for the production of an indane compound having the formula

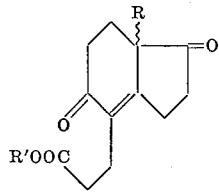

wherein R represents lower alkyl, and R' represents a member selected from the group consisting of hydrogen and lower alkyl, which comprises the steps of (a) condensing a lower alkyl ester of 5-oxo-6-heptenoic acid with a 2-lower alkyl-4-carboxy-cyclopentane-1,3-dione in the presence of an alkaline condensation agent, (b) treating the condensation product with an acidic compound selected from the group consisting of mineral acids, organic acids and Lewis-type mixed acid bases, and (c) recovering said indane compound.

These and other objects of the invention will become more apparent as the description thereof proceeds.

DESCRIPTION OF THE INVENTION

It has now been discovered that it is possible to effect the synthesis of the compounds belonging to general Formula I by using as starting products, instead of 2-alkyl-cyclopentane-1,3-dione, previously mentioned, the corresponding 4-carboxyl derivatives which are the precursors for the preparation of the diones (as indicated in copending, commonly assigned U.S. patent application Ser. No. 361,877, filed Apr. 22, 1964).

In effect, on the resultant condensation product the carboxylic function is poorly stable and is rapidly cleaved in the reaction media.

This process presents, among others, the advantage of eliminating the decarboxylation step, necessary according to the former methods, and thus shortening the synthesis.

A description of the process of the invention can be better understood with reference to the following flow diagram.

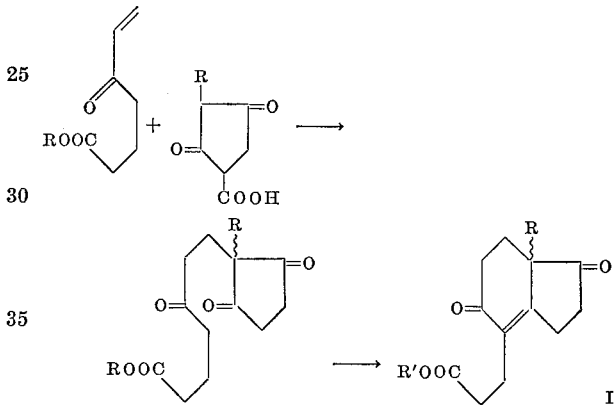

The ≀ bond in Formula I represents the presence of a mixture of 7aα and 7aβ epimers.

R represents a lower alkyl.

R' represents a member selected from the group consisting of hydrogen and lower alkyl.

The process of the invention is characterized in that a lower alkyl ester of 5-oxo-6-heptenoic acid is condensed with a 2-lower alkyl-4-carboxy-cyclopentane-1,3-dione in the presence of an alkaline condensation agent. The condensation product, which need not be isolated, is treated with an acid in the presence of water to obtain 1,5-dioxo-4-(2'-carboxy-ethyl)-7a-lower alkyl-5,6,7,7a-tetrahydro-indane (I, with R'=H) directly or by an acid or an acidic reacting compound in an anhydrous media, such as a Lewis-type mixed acid base, to recover the lower alkyl ester of the above indane compound (I, with R'=lower alkyl).

Preferably, the process of the invention is executed under the following conditions. However, other equivalent operatory modes may be employed.

Preferably, the methyl or ethyl ester is used as the lower alkyl ester of 5-oxo-6-heptenoic acid.

The condensation of the lower alkyl ester of 5-oxo-6-heptenoic acid with a 2-alkyl-4-carboxy-cyclopentane-1,3-dione in the presence of an alkaline condensation agent is advantageously effected in the presence of a tertiary organic amine base such as triethylamine, pyridine, an α, β or γ-picoline, etc., or a secondary organic amine base such as morpholine, or also in the presence of a salt of the bases previously mentioned as, for example, pyridinium phosphate. It is advantageous to conduct the reaction under anhydrous conditions in the presence of an organic solvent at temperatures from room temperature up to the reflux temperature. Small amounts of hydroquinone may also be utilized in the reaction media.

The condensation of a lower alkyl ester of 5-oxo-6-heptenoic acid with a 2-alkyl-4-carboxy-cyclopentane-1,3-dione furnishes the corresponding ester of 7-(1',3'-dioxo-2' - lower alkyl - cyclopentyl - 2') - 5 - oxo - heptanoic acid, which does not need to be isolated. If this compound is treated in an anhydrous media with an organic acid such as p-toluene sulfonic acid or a mineral acid as, for example, hydrochloric or sulfuric acid, or with a mixed acid base, in the sense of this term given by the definition of Lewis, for example, by a quaternary ammonium salt such as acetate or benzoate of trimethylamine or of triethylamine, the acetate or phosphate of piperidine or also the sodium acetate-acetic acid anhydride complex, the compound of the general Formula I is obtained in the form of ester (R'=lower alkyl).

If, on the other hand, as it is far simpler, the condensation product is treated with an acid in an aqueous media at an elevated temperature, as for example, in aqueous hydrochloric acid, sulfuric acid or phosphoric acid, the free acid is obtained directly.

The following examples will serve for better comprehension of the invention. However, it is to be understood that they do not limit the invention to any extent.

Example I.—Preparation of 1,5 - dioxo - 4 - (2' -carboxy-ethyl) - 7a - methyl - 5,6,6,7a - tetrahydro - indane (I, R=CH₃, R'=H)

2.15 gm. of methyl 5-oxo-6-heptenoate and 1.48 gm. of 2 - methyl - 4 - carboxy - cyclopentane - 1,3, - dione, having a melting point of 160° C., were introduced into a mixture of 5 cc. of methanol and 3.37 cc. of triethylamine. The reaction mixture was agitated over a period of 20 hours at room temperature. Then the reaction mixture was distilled to dryness under vacuum.

The residue obtained was introduced into 20 cc. of 5 N hydrochloric acid. The mixture was heated on a steam bath for ½ hour, cooled to room temperature and saturated with ammonium sulfate. Next, the reaction product was extracted with chloroform. The extracts were washed with a 50% aqueous solution of ammonium sulfate, then dried and evaporated to dryness under vacuum.

The residue, treated first with hot isopropylic ether and then with hot methyl-ethyl-ketone, furnished 1,5-dioxo-4-(2' - carboxy - ethyl) - 7a - methyl - 5,6,7,7a - tetrahydro-indane (I, R=CH₃, R'=H) having a melting point of 126° C.

The starting 2 - methyl - 4 - carboxy - cyclopentane-1,3-dione is described in the U.S. patent application Ser. No. 361,877.

Example II.—Preparation of 1,5 - dioxo - 4 - (2' - carbomethoxy - ethyl)7a - methyl - 5,6,7,7a - tetrahydro-indane (I, R=R'=CH₃)

1.6 gm. of methyl 5-oxo-6-heptenoate and 1.5 gm. of 2 - methyl - 4 - carboxy - cyclopentane - 1,3 - dione were introduced into a mixture of 1 cc. of pyridine, 3.5 cc. of toluene and 15 mg. of hydroquinone. The reaction mixture was heated at reflux under an atmosphere of nitrogen over a period of 16 hours. Thereafter, the reaction mixture was cooled and 10 cc. of benzene were added thereto. The mixture was washed with N hydrochloric acid, then with water and finally with a solution of sodium bicarbonate. After drying, the organic phase was evaporated to dryness under vacuum.

The residue obtained was dissolved in 10 cc. of benzene; 50 mg. of p-toluene sulfonic acid were added, and the mixture was heated at reflux for 5 hours. Thereafter, the mixture was diluted with ether, washed first with water, then with a solution of sodium bicarbonate, dried and evaporated to dryness under vacuum.

The residue was crystallized from ether and was recrystallized from isopropyl ether. In this manner, 1,5-dioxo-4 - (2' - carbomethoxy - ethyl) - 7a - methyl - 5,6,7,7a- tetrahydro-indane (I, R=R'=CH₃) was obtained. The product had a melting point of 76° C.

Example III.—Preparation of 1,5 - dioxo - 4 - (2' - carboxy - ethyl) - 7a - ethyl - 5,6,7,7a - tetrahydro - indane (I, R=C₂H₅, R'=H)

1.72 gm. of methyl 5-oxo-6-heptenoate and 1.28 gm. of 2 - ethyl - 4 - carboxy -cyclopentane - 1,3 - dione, having a melting point of 175° C., were introduced into a mixture of 4 cc. of methanol and 2.7 cc. of triethylamine. The reaction mixture was agitated for 36 hours at a temperature of 20 to 25° C. and thereafter poured into an aqueous hydrochloric acid solution. Next, the mixture was extracted with methylene chloride. The extract was washed with water, dried and evaporated to dryness under vacuum.

The residue thus obtained was then taken up in 15 cc. of 5 N hydrochloric acid. The reaction mixture was heated on a steam bath for about 45 minutes, cooled and saturated with ammonium sulfate. Then the reaction mixture was extracted with chloroform. The extracts were washed with a 50% aqueous solution of ammonium sulfate, dried and evaporated to dryness under vacuum.

The dry residue was crystallized by treatment with toluene. The crystals thus formed were vacuum filtered, then recrystallized from methyl ethyl-ketone. In this way, 1,5 - dioxo - 4 - (2'-carboxy-ethyl)-7a-ethyl-5,6,7,7a-tetrahydro-indane (I, R=C₂H₅, R'=H) was isolated. The melting point of the product was 119.5° C.

The starting product, namely, 2-ethyl-4-carboxycyclopentane-1,3-dione is described in U.S. patent application Ser. No. 361,877.

Example IV.—Preparation of 1,5-dioxo-4-(2'-carboxyethyl) - 7a-n-propyl-5,6,7,7a-tetrahydro-indane (I, R= n—C₃H₇, R'=H)

A mixture of 3 gm. of 2-n-propyl-4-carboxy-cyclopentane-1,3-dione, with a melting point of first 170° C., then of 180° C., 3.2 gm. of methyl 5-oxo-6-heptenoate and 5.7 cc. of pyridine was heated for several hours at a temperature of about 120° C. under an atmosphere of nitrogen.

After the mixture had been cooled, 40 cc. of 5 N hydrochloric acid were added and the reaction mixture was maintained at reflux for about 1 hour. Thereafter, the reaction mixture was cooled and extracted with methylene chloride. The organic extracts were washed first with water, then with a saturated solution of sodium bicarbonate, dried and evaporated to dryness under vacuum.

In this way, 1,5-dioxo-4-(2'-carboxy-ethyl)-7a-n-propyl-5,6,7,7a-tetrahydro-indane (I, R=n—C₃H₇, R'=H) was isolated in the form of an oil. Its ultraviolet spectra, measured in ethanol in the presence of N/1,000 sodium hydroxide showed a λ max. at 254–255 mμ (ε=14,200).

The starting product, 2-n-propyl-4-carboxy-cyclopentane-1,3-dione, is described in U.S. patent application Ser. No. 361,877.

The preceding specific embodiments are illustrative of the invention. It is to be understood, however, that other expedients, known to those skilled in the art, may be employed without departing from the spirit of the invention.

We claim:

1. A process for the production of an indane compound having the formula

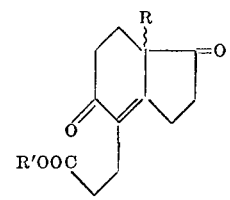

wherein R represents lower alkyl, and R' represents a member selected from the group consisting of hydrogen and lower alkyl, which comprises the steps of
  (a) condensing a lower alkyl ester of 5-oxo-6-heptenoic acid with a 2-lower alkyl-4-carboxy-cyclopentane-1,3-dione in the presence of an alkaline condensation agent,
  (b) treating the condensation product with an acidic compound selected from the group consisting of mineral acids, organic acids and Lewis-type mixed acid bases, and
  (c) recovering said indane compound.

2. The process of claim 1, step (a), wherein said lower alkyl ester of 5-oxo-6-heptenoic acid is methyl 5-oxo-6-heptenoate.

3. The process of claim 1, step (a), wherein said lower alkyl ester of 5-oxo-6-heptenoic acid is ethyl 5-oxo-6-heptenoate.

4. The process of claim 1, step (a), wherein said alkaline condensation agent employed for the condensation of the lower alkyl ester of 5-oxo-6-heptenoic acid with 2-lower alkyl-4-carboxy-cyclopentane-1,3-dione is a tertiary amine base.

5. The process of claim 4 wherein said tertiary base is selected from the group consisting of pyridine, lower alkyl-pyridine, triethylamine and salts thereof.

6. The process of claim 1, step (a), wherein said alkaline condensation agent employed for the condensation of the lower alkyl ester of 5-oxo-6-heptenoic acid with 2-lower alkyl-4-carboxy-cyclopentane-1,3-dione is a secondary organic amine base.

7. The process of claim 6 wherein said secondary organic amine base is morpholine.

8. The process of claim 1, step (b), wherein said acidic compound is an aqueous strong mineral acid and racemic 1,5-dioxo-4-(2'-carboxy-ethyl)-7a-lower alkyl-5,6,7,7a-tetrahydro-indane is recovered.

9. The process of claim 8, wherein said aqueous strong mineral acid is selected from the group consisting of aqueous hydrochloric acid, aqueous sulfuric acid and aqueous phosphoric acid.

10. The process of claim 1, step (b), wherein said acidic compound is present in an anhydrous inert organic solvent, racemic 1,5-dioxo-4-(2'-carbo-lower alkoxy-ethyl)-7a-lower alkyl-5,6,7,7a-tetrahydro-indane is recovered.

11. The process of claim 10, wherein said acidic compound is selected from the group consisting of hydrochloric acid, sulfuric acid and p-toluene sulfonic acid.

12. The process of claim 10, wherein said acidic compound is a Lewis-type mixed acid base selected from the group consisting of trimethylamine acetate, trimethylamine benzoate, triethylamine acetate, triethylamine benzoate, piperidine acetate, piperidine phosphate and sodium acetate-acetic acid anhydride complex.

References Cited
FOREIGN PATENTS 1,384,854  11/1964  France.

JAMES A. PATTEN, Primary Examiner

P. J. KILLOS, Assistant Examiner

U.S. Cl. X.R.

260—514